United States Patent [19]
De Coster

[11] Patent Number: 6,075,224
[45] Date of Patent: Jun. 13, 2000

[54] METHOD OF AND APPARATUS FOR INITIATING A WELDING ARC

[75] Inventor: Albert J. De Coster, Kaukaune, Wis.

[73] Assignee: Illinois Tool Works Inc, Gleanview, Ill.

[21] Appl. No.: 09/053,255

[22] Filed: Apr. 1, 1998

[51] Int. Cl.⁷ .................................................. B23K 9/067
[52] U.S. Cl. ..................................... 219/130.4; 219/130.5
[58] Field of Search ............................. 219/130.4, 130.5, 219/130.51, 137 PS, 60 A

[56] References Cited

U.S. PATENT DOCUMENTS

| | | | |
|---|---|---|---|
| 3,118,051 | 1/1964 | Dixon .................................... | 219/130.5 |
| 3,536,879 | 10/1970 | Hartsell, Jr. et al. ................. | 219/60 A |
| 3,689,734 | 9/1972 | Burley et al. ......................... | 219/130.5 |
| 3,774,007 | 11/1973 | Chiasson et al. ..................... | 219/130.4 |
| 3,784,778 | 1/1974 | McPherson et al. .................. | 219/60 A |
| 3,832,513 | 8/1974 | Klasson ................................. | 219/75 |
| 4,092,517 | 5/1978 | Woodacre .......................... | 219/137 PS |
| 5,308,952 | 5/1994 | Bunker et al. . | |
| 5,705,790 | 1/1998 | Klebl et al. . | |
| 5,773,792 | 6/1998 | Hagiwara et al. ................... | 219/130.4 |

FOREIGN PATENT DOCUMENTS

| | | |
|---|---|---|
| 2 115 993 | 9/1983 | United Kingdom . |
| 2 250 704 | 6/1992 | United Kingdom . |

Primary Examiner—Clifford C. Shaw
Attorney, Agent, or Firm—Mark W. Croll; Thomas W. Buckman; John P. O'Brien

[57] ABSTRACT

A method and apparatus for initiating a welding arc includes a controller coupled to a power circuit for enabling the power circuit a predetermined time after an arc starter circuit has applied an arc starting signal at the power output of a welding device. The apparatus further includes a protective gas source for providing a protective gas, such as argon or helium, to the welding site. The arc starting signal ionizes the gas to aid in initiating the welding arc.

24 Claims, 4 Drawing Sheets

METHOD OF AND APPARATUS FOR INITIATING A WELDING ARC

FIELD OF THE INVENTION

The present invention relates generally to a method of and apparatus for starting a welding arc, and more specifically to a method of and apparatus for starting a welding arc by applying an arc starting signal to ionize the protective gas before enabling output power.

BACKGROUND OF THE INVENTION

Many methods of welding are known in the art, each with its own advantages and disadvantages. Common welding processes include gas welding, oxyacetylene brazing and soldering, shielded metal arc welding (SMAW) or "STICK" welding, metal inert gas (MIG) or "wire feed" welding, gas tungsten arc welding (GTAW) or "TIG" welding, and plasma cutting. TIG welding is perhaps the cleanest, most precise of all hand-held welding operations. Although the method and apparatus of the present invention is preferably directed to a TIG welding operation, one skilled in the art will appreciate that the present invention may have applications for many other welding processes.

A TIG welding process will now be described with reference to FIG. 1. In TIG welding, a concentrated high-temperature arc is drawn between a non-consumable tungsten electrode 10 and a workpiece 14, workpiece 14 being connected to the output of a welding power source (not shown) via a work clamp 24. Electrode 10 rests in a torch 16, the torch including a protective gas source 18, such as a cup, to direct a protective gas 20, such as argon, helium, a mixture thereof, or other inert or non-inert gasses, to a welding site 22 on workpiece 14. Torch 16 receives a flow of protective gas 20 from a gas tank (not shown). The welder strikes an arc by touching or scraping electrode 10 against workpiece 14 to close a circuit between electrode 10 and work clamp 24. As electrode 10 is drawn away from workpiece 14, an arc 12 is initiated. The welder then feeds a bare welding rod 26 to welding site 22, thereby creating a molten puddle 28. Molten puddle 28 hardens to leave a weld bead 30 joining two pieces of metal.

Numerous problems persist with this physical method of striking an arc because the tip of the tungsten electrode usually breaks off due to touching or scraping the electrode against the workpiece. Often, the tip falls into the molten puddle and contaminates the weld. Also, the welder must then resharpen or replace the electrode. Not only does this process inconvenience the welder, but it also wastes time and resources, which ultimately imparts a higher cost to each weld.

One known solution is to use a copper plate to strike the arc. The plate is placed on the workpiece alongside the weld and used to strike the arc, after which the arc is moved to the proper welding location to begin welding. Though the copper plate tends to reduce the frequency with which the electrode will break, breakage still occurs because the electrode is struck against a metal. Also, the manipulation of a copper plate near the weld site can become cumbersome for the welder, adding to welder fatigue and reducing productivity.

To address these problems, arc starter circuits, such as circuits which produce high frequency pulses, have been designed to electronically initiate the welding arc. In such known arc starter circuits, a preflow of protective gas is allowed, followed by the simultaneous initiation of an arc starting signal along with enablement of output current flow. It has been found, however, that this method of arc initiation does not reliably start the arc.

Accordingly, what is needed is an improved method and apparatus for initiating a welding arc to overcome the problems and limitations of the prior art.

SUMMARY OF THE INVENTION

These and other needs are accomplished by the method and apparatus of the present invention in which, according to one embodiment, a welding device includes a power circuit to provide welding power, a protective gas source to provide a protective gas at a welding site disposed between an electrode and a workpiece, an arc starter circuit to apply an arc starting signal to ionize the gas, and a controller coupled to a control input of the power circuit. A predetermined time after the arc starting signal is applied, the controller enables the power circuit such that welding power is provided and an arc is drawn between the electrode and the workpiece.

According to one feature of the invention, the controller enables the power circuit 100 milliseconds after the arc starter circuit applies the arc starting signal.

In one aspect of the invention, the arc starting signal is a high frequency, high voltage signal.

In another aspect of the invention, the power circuit is a phase-controlled power circuit.

BRIEF DESCRIPTION OF THE DRAWINGS

The present invention will become more fully understood from the following detailed description, taken in conjunction with the accompanying drawings, in which like reference numerals denote like-elements and.

DETAILED DESCRIPTION OF A PREFERRED EMBODIMENT

Figure 2:
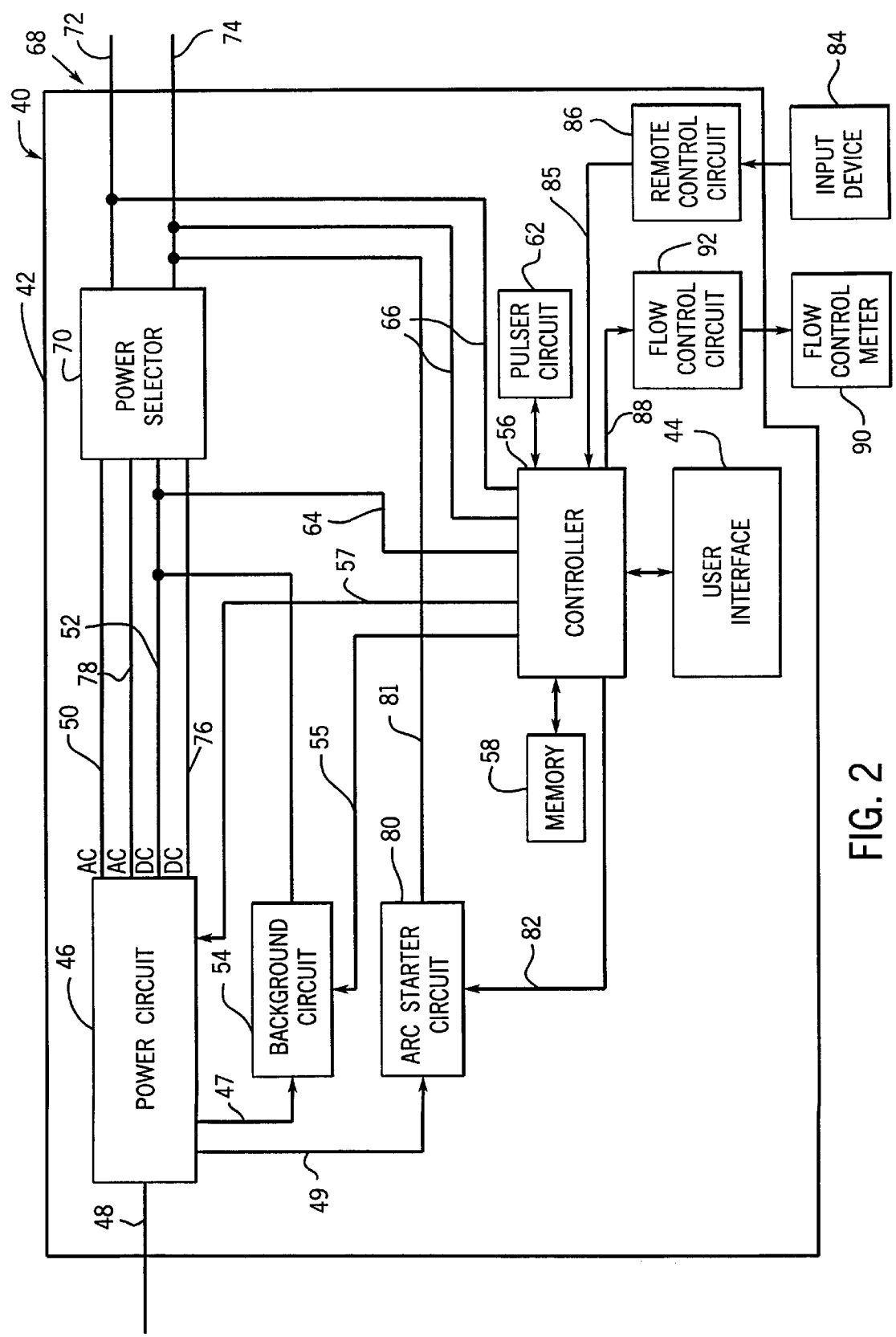
FIG. 2 is a block diagram of a welding device according to a preferred embodiment of the present invention, the welding device having the capability to start an arc for performance of a welding process, such as the TIG welding process shown in FIG. 1.

Referring to FIG. 2, there is shown a block diagram of a welding device 40 according to a preferred embodiment of the present invention. Welding device 40 includes a power source 42, and may include other welding equipment not shown such as torch 16, a gas tank, a stand and other welding components well-known in the art. Welding device 40 is preferably a TIG/STICK welding device, allowing the welder to use device 40 for either TIG or STICK welding by selecting the appropriate operation via user interface 44 and attaching the necessary welding equipment, e.g. a torch and gas tank for TIG welding, or a stinger for STICK welding.

Power source 42 includes a power circuit 46. Power circuit 46 receives input power from a power input 48 and converts it to both AC and DC welding power available at AC and DC power outputs 50, 78 and 52, 76, respectively.

Power circuit 46 is preferably a phase-controlled power source utilizing silicon controlled rectifiers (SCRs) to convert power received at power input 48 to usable welding power, as is well-known in the art. Alternatively, one skilled in the art could apply the principles of the present invention to other well-known power converter and inverter topologies.

A controller 56 is operatively coupled to power circuit 46. Controller 56 includes a microprocessor, preferably an Intel 80C196KC-20 which performs many control functions in welding device 40. Alternatively, controller 56 could include discrete component control circuitry to perform these control functions. Controller 56 controls the output power from power circuit 46 by generating control signals at path 57 to control the switching components (e.g., SCRS, IGBTS, etc.) in power circuit 46.

Controller 56 receives user-selected operating parameters from user interface 44. In this preferred embodiment, user interface 44 includes a plurality of selectors (not shown) operable by the user to select a welding process (STICK/TIG), a current control (PANEL/REMOTE), an output control (ON/REMOTE), a start mode (OFF/LIFT/HFSTART/HFCONT), a pulser function and parameters related thereto, a positive/negative balance control for AC TIG welding, a DIG control for STICK welding, an amperage level, a spot welding operation, and a sequence selection such as start current, final (crater) current, or both. Controller 56 also transmits to user interface 44 information about the welding operation that is valuable to the welder, including arc voltage, arc amperage, and preferred selector settings. Controller 56 is further coupled to a pulser circuit 62 for performing a pulser function as is well-known in the art. A memory 58 is coupled to controller 56 for storing data including the settings of the selectors on user interface 44 for future recall after power-down or between welding cycles.

Referring still to FIG. 2, controller 56 receives current feedback signals indicative of the DC output current level from DC power output 52, 76 via a current feedback path 64. Controller 56 also receives voltage feedback signals indicative of the voltage at a power output 68 via voltage feedback path 66. Power output 68 includes an electrode terminal 74 adapted to receive a torch electrode and a work clamp terminal 72 adapted to receive a work clamp or other workpiece reference element. A power selector 70 provides user-selectable control of the type of output power provided at power output 68 (e.g., AC, DC electrode negative, or DC electrode positive).

Welding device 40 further includes a background circuit 54 which, during DC welding processes, is enabled by controller 56 via a control input 55. Background circuit 54 receives input power from power circuit 46 along path 47 and generates a low power output signal which maintains the welding arc during low amperage welding conditions, i.e., at output current levels of approximately 5 amperes or less.

Welding device 40 further includes an arc starter circuit 80. Arc starter circuit 80 is controlled by controller 56 via a control path 82 and receives power from power circuit 46 along path 49. Arc starter circuit 80 responds to controller 56 by either enabling or disabling the application of an arc starting signal via path 81 at power output 68. Circuit 80 may be any arc starter circuit known in the art, such as a capacitive discharge circuit, a pilot arc circuit, or an impulse arc circuit, but preferably is a high frequency start circuit such as the circuit illustrated in FIG. 2A.

Figure 2A:
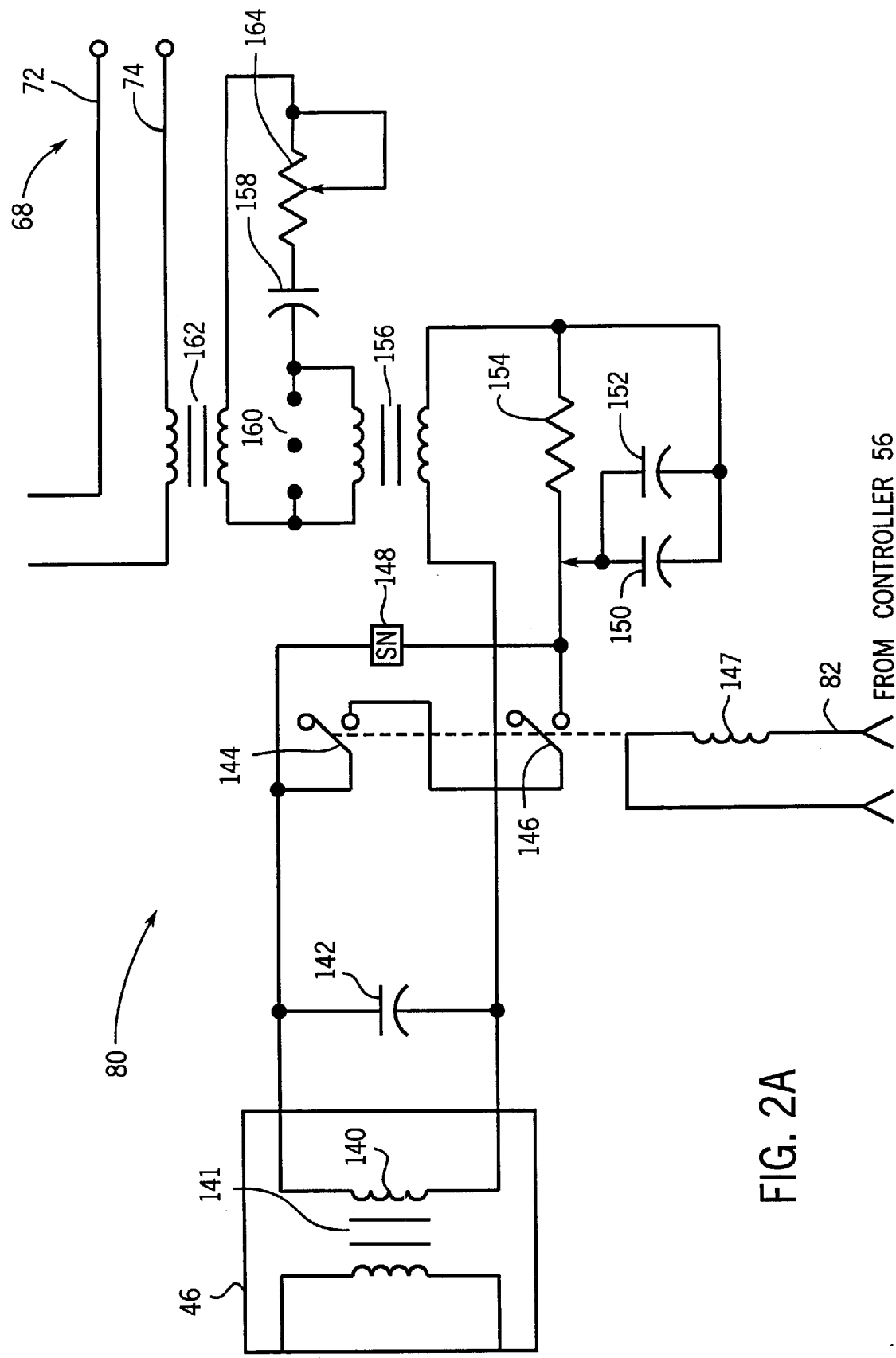
FIG. 2A is a schematic of the arc starter circuit of FIG. 2, according to a preferred embodiment of the present invention.

Referring now to FIG. 2A, FIG. 2A is a schematic of arc starter circuit 80 according to a preferred embodiment of the present invention. Circuit 80 is a high frequency start circuit that receives input power from power circuit 46, such as via a secondary winding 140 off the power circuit's main power transformer 141. Circuit 80 includes a capacitor 142, which terminates winding 140, and relay switches 144, 146 to enable or disable application of the arc starting signal at power output 68. Application of the arc starting signal is governed by a control signal received via path 82 from controller 56, which activates relay coil 147 to drive switches 144, 146. Circuit 80 further includes a snubber 148 or similar filtering device for removing voltage spikes due to the switching of switches 144, 146. A network of capacitors 150, 152 and resistor 154 drives a high frequency step-up transformer 156 to charge a capacitor 158. Capacitor 158 discharges into a high frequency coupling coil 162 through spark gap 160, coil 162 supplying high frequency to the power output 68, preferably at electrode terminal 74.

The arc starting signal preferably has a peak-to-peak voltage $V_{p-p}$ adjustable by spark gap 160. The arc starting signal has an oscillation frequency and a repetition rate, the repetition rate being adjustable by an optional user-operable or controller-adjustable intensity controller 164 (e.g., a potentiometer). The oscillation frequency of the arc starting signal is preferably about 1.5 megahertz (MHz), and could alternatively be between about 1 MHz and 2 MHz. The repetition rate of the arc starting signal is preferably on the order of about 700 Hz or between about 1 HZ and 1 kHz and may even vary randomly within that range. The voltage of arc starting signal is preferably 15,000 $V_{p-p}$, but could alternatively be between 2,000 $V_{p-p}$ and about 25,000 $V_{p-p}$.

Figure 1:
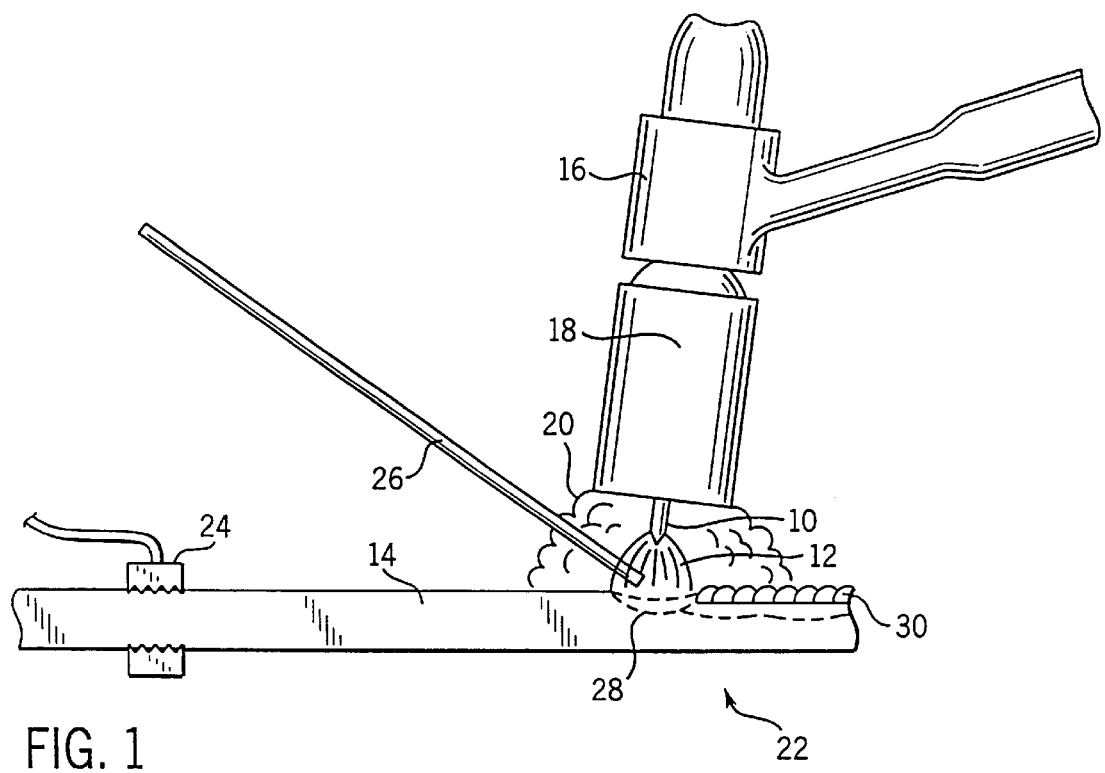
FIG. 1 illustrates the components used to perform a TIG welding operation as is known in the art.

Controller 56 also receives remote control inputs from an input device 84 through a remote control circuit 86 via a path 85. Input device 84 is useroperable and can be used to control welding power output. The flow of protective gas is also controlled by controller 56. In this embodiment, a control signal is sent from controller 56 via a path 88 through a flow control circuit 92 to a flow control meter 90. Flow control meter 90 is coupled to a gas tank (not shown) for regulating the flow of protective gas from the gas tank to the welding site (see FIG. 1). Alternatively, flow control meter 90 could be internal to power source 42 with a gas flow channel (not shown) extending from the gas tank, through power source 42, through flow control meter 90, then out to torch 16 for provision to welding site 22 through gas source 18.

Power source 42 may have more or fewer functions than those illustrated in FIG. 2 without departing from the scope of the present invention (e.g. power source 42 may not include pulser circuit 62). Additionally, embodiments of the functions shown may be wide and varied. For example, input device 84 could be a finger trigger, a foot pedal, or some other type of input device.

Figure 3:
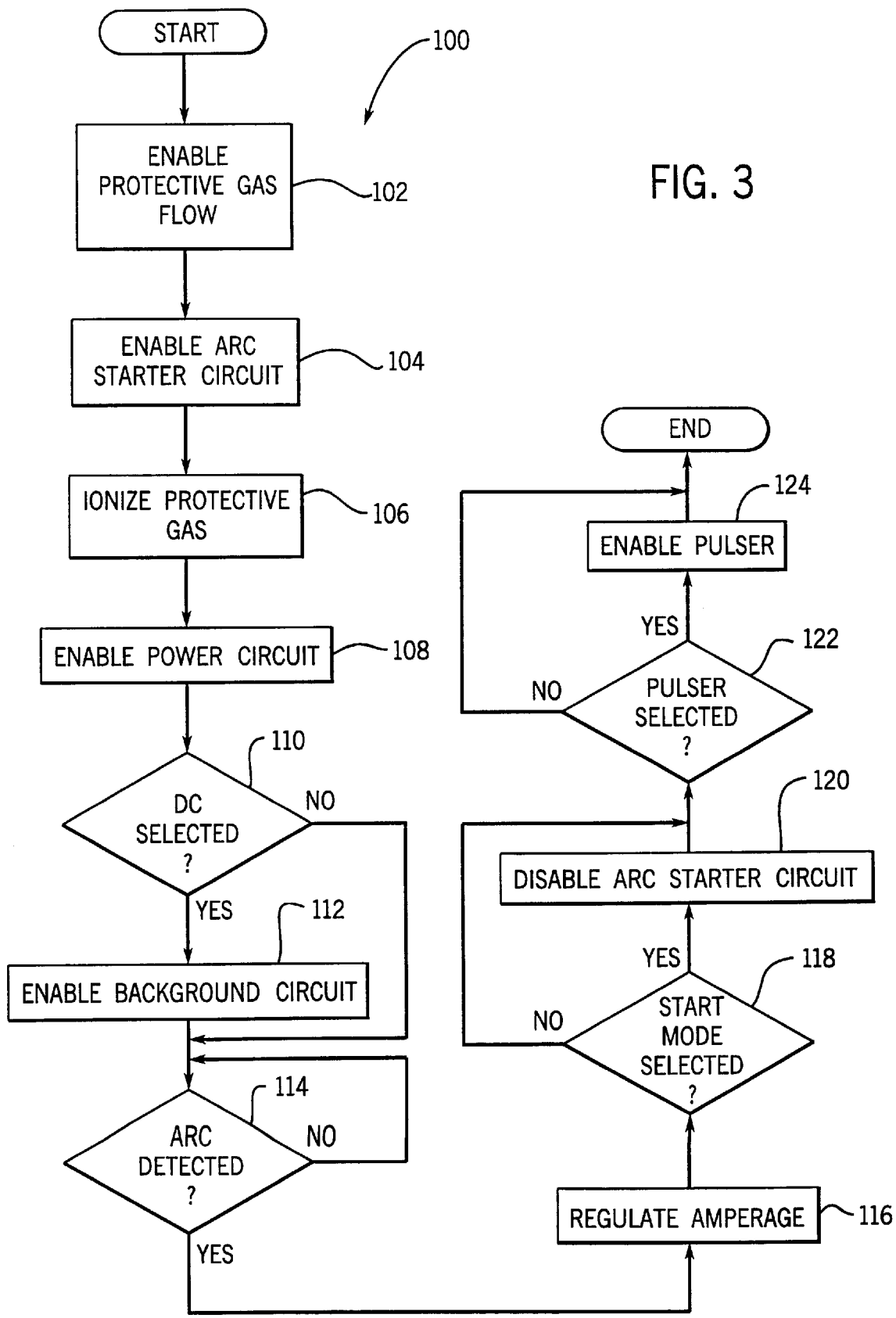
FIG. 3 is a flowchart showing the steps of the method that the welding device of FIG. 2 follows to start a welding arc in accordance with a preferred embodiment of the present invention.

Referring now to FIG. 3, FIG. 3 is a flowchart showing the steps in an arc starting method according to a preferred embodiment of the present invention. The arc starting steps are preferably controlled by controller 56, according to program code stored within controller 56, in conjunction with the various circuitry described above with reference to FIGS. 2 and 2A. The arc starting method of FIG. 3 preferably starts either an AC TIG or DC TIG process. Further, the arc starter circuit 80 may be operated in either a START mode, in which the arc starting signal is applied only to initiate the arc at the start of the welding process, or a continuous (CONT) mode, in which the arc starting signal is applied periodically throughout an AC welding process to maintain the welding arc when the AC output waveform transitions through zero. However, the arc starting method, and derivations thereof, will find applications in other welding processes and start modes.

In the method illustrated in FIG. 3, the welder begins the welding process by setting the welding device to either AC TIG or DC TIG and the start mode to either START or CONT using selectors on user interface 44. Other welding parameters such as amperage level and pulser function may be selected at this time via user interface 44. When output control is turned ON by remote input device 84, start mode 100 begins. At a step 102, controller 56 enables flow control meter 90 through flow control circuit 92 to begin supplying protective gas to the welding site. The gas may flow for a preflow period set by a user-operable selector on user interface 44 which ranges, for example, from zero to 10 seconds. When the preflow period has expired, controller 56 enables arc starter circuit 80 via control input 82 (step 104). At a step 106, circuit 80 generates an arc starting signal which it provides to power output 68 for a predetermined period of time during which the arc starting signal ionizes the flow of protective gas particles. Preferably, no arc suitable for welding is drawn at this step. The predetermined period of time is preferably about 100 milliseconds. The predetermined period of time may be as short as the time it takes the arc starting signal to cross the gap between electrode 10 and workpiece 14. The predetermined time may be as long as 1 second, though beyond 1 second the welder may get impatient waiting for the next step in start mode 100.

At a step 108, controller 56 enables power circuit 46 via a control signal applied to control input 57 such that either AC or DC power (as selected by the user) may be provided to power output 68. At a step 110, if DC TIG has been selected, controller 56 also enables background circuit 54 via input 55 at a step 112. Background circuit 54 may be enabled either simultaneously with enablement of power circuit 46 or some time period (e.g., several seconds) thereafter, but preferably background circuit 54 is enabled about 20 millisecond thereafter. At a step 114, controller 56 determines whether an arc has been drawn by monitoring the voltage feedback signals via voltage feedback path 66. For example, if the voltage feedback signals indicate that the output voltage has dropped below a certain level (e.g., less than 50 Volts), then an arc is deemed present.

At a step 116, if an arc is detected, controller 56 sends a control signal to power circuit 46 via control input 57 to cause power circuit 46 to begin regulating the output current. During a DC TIG welding process, once an arc is detected at step 114, controller 56 causes power circuit 46 to provide DC power at the greater of 40 amperes or the user-selected amperage via user interface 44. This ensures that a predetermined minimum current is provided to prevent the arc from extinguishing, the predetermined minimum preferably being 40 amperes, though other amperages may suffice as well. If a valid arc is maintained for approximately 40 milliseconds at the predetermined minimum current, controller 56 sends a second control signal to cause power circuit 46 to raise the DC power from the predetermined minimum current to the user-selected amperage or to some other predetermined level after which the method continues at a step 118. Preferably, controller 56 causes power circuit 46 to jump the DC power up to the user-selected amperage, though controller 56 may also cause the power circuit 46 to ramp up the DC power over time. During an AC TIG welding process, once an arc is detected at step 114, controller 56 causes power circuit 46 to provide AC power with a balance of preferably 55% electrode positive (EP) to 45% electrode negative (EN). A more EP balance is more conducive to initiating and maintaining a welding arc then is a more EN balance. This first predetermined balance favoring EP is maintained for approximately 40 milliseconds, after which controller 56 sends a second control signal to cause power circuit 46 to ramp the predetermined balance to the user-selected balance, or to some other predetermined level, after which the method continues at a step 118.

Although the arc regulation of step 116 has been described in a preferred embodiment above, this embodiment is merely exemplary. Many other types of arc regulation are known in the art and are considered a part of the present invention.

At step 118, if the START mode has been selected, controller 56 will proceed to a step 120. At step 120, the arc is monitored for a period of time, preferably about 0.75 seconds, to ensure the arc will remain stable, after which controller 56 disables arc starter circuit 80. Circuit 80 then remains disabled for the remainder of the welding process. If, at step 118, the START mode has not been selected (i.e., the CONT mode has been selected), arc starter circuit 80 will remain enabled such that the arc starting signal is applied continuously throughout the welding cycle to maintain the arc. Finally, if the pulser option has been selected as determined at a step 122, controller 56 enables pulser circuit 62 to control power circuit 46 for a pulsed welding power at a step 124.

Although the foregoing description has been provided for the presently preferred embodiment of the invention, the invention is not intended to be limited to any particular arrangement, but is defined by the appended claims. For example, a method for initiating and maintaining a welding arc need not include all of the steps of start mode 100, nor need the method include all the same time periods and amperage values as in the presently preferred embodiment. Reasonable ranges as would be known to those skilled in the art should be presumed to be part of the present invention. Likewise, although STICK and TIG processes are used in this preferred embodiment, the present invention has applications in numerous other welding devices. These and other alternative configurations of the invention that may occur to those skilled in the art are intended to form a part of the invention to the extent such alternatives fall within the scope of the appended claims.

What is claimed is:

1. A welding device for providing an arc between an electrode and a workpiece defining a welding site therebetween, comprising:

a power circuit to provide a welding power on a welding output, the power circuit having a control input;

a protective gas source to provide a protective gas at the welding site;

an arc starter circuit to apply an arc starting signal at the welding output, wherein the arc starting signal ionizes the protective gas; and a controller coupled to the control input, wherein the controller applies a control signal to the control input to enable the power circuit to provide the welding power a first predetermined time delay after the arc starter circuit applies the arc starting signal, whereby the arc may be drawn between the electrode and the workpiece.

2. The welding device as recited in claim 1, wherein the power circuit is a phase-controlled power circuit.

3. The welding device as recited in claim 1, wherein the arc starter circuit has a second control input, the controller is coupled to the second control input, and the controller applies a second control signal to the second control input to enable the arc starter circuit to apply the arc starting signal at the welding output.

4. The welding device as recited in claim 1, wherein the arc starting signal is a high frequency, high voltage signal.

5. The welding device as recited in claim 1, wherein the first predetermined time delay is approximately 100 milliseconds.

6. The welding device as recited in claim 1, wherein the first predetermined time delay is between approximately 1 millisecond and 1000 milliseconds.

7. The welding device as recited in claim 1, wherein the protective gas is an inert gas.

8. The welding device as recited in claim 1, wherein the controller disables the arc starter circuit a second predetermined time after the arc is drawn.

9. The welding device as recited in claim 1, wherein the control signal causes the power circuit to provide the welding power at a predetermined minimum level.

10. The welding device as recited in claim 9, wherein the controller provides a second control signal to the power circuit to cause the welding power to raise to a second predetermined level.

11. The welding device as recited in claim 1, wherein the control signal causes the power circuit to provide an AC welding power having a predetermined balance wherein the electrode is positive for a greater period of time than the electrode is negative.

12. The welding device as recited in claim 11, wherein the controller provides a second control signal to the power circuit to cause the welding power to ramp to a second predetermined balance.

13. A method of initiating a welding arc at a welding site using a welding device having a power circuit to provide welding power at a power output, comprising:

providing a flow of protective gas at the welding site;

generating an arc starting signal at the power output of the welding device to ionize the flow of protective gas; and enabling the power circuit to provide an output current at the power output of the welding device a predetermined time delay after generating the arc starting signal, whereby the welding arc is initiated at the welding site.

14. The method as recited in claim 13, wherein the power circuit is a phase-controlled power circuit.

15. The method as recited in claim 13, wherein the predetermined time delay is approximately 100 milliseconds.

16. The method as recited in claim 13, wherein the predetermined time delay is between approximately 1 millisecond and 1000 milliseconds.

17. The method as recited in claim 13, wherein the protective gas is an inert gas.

18. The method as recited in claim 13, wherein the flow of protective gas is provided a second predetermined time before the arc starting signal is applied.

19. The method as recited in claim 18, wherein the second predetermined time is set by a user-operable selector.

20. The method as recited in claim 13, further comprising disabling the arc starting signal after the welding arc is initiated.

21. A welding device having a power output to provide output power for performing a welding process at a welding site, comprising:

means for providing a flow of protective gas at the welding site;

means for applying an arc starting signal at the power output, whereby the protective gas is ionized; and means for generating an output current at the power output a predetermined time delay after applying the arc starting signal, whereby an arc may be initiated at the welding site.

22. The welding device as recited in claim 21, wherein the arc starting signal is a high frequency signal.

23. The welding device as recited in claim 21, wherein the predetermined time delay is approximately 100 milliseconds.

24. The welding device as recited in claim 21, wherein the predetermined time delay is between approximately 1 millisecond and 1000 milliseconds.

* * * * *